(12) United States Patent
Hsieh

(10) Patent No.: US 6,761,323 B2
(45) Date of Patent: Jul. 13, 2004

(54) WATER JET MECHANISM WITH COMPOSITE CONTROL LIGHT-EMITTING MODULES

(76) Inventor: Johnny Hsieh, 1F.,No. 11,Lane 193.Sec 2, San-Min Rd., Pan-Chiao, Taipei (CN)

( * ) Notice: Subject to any disclaimer, the term of this patent is extended or adjusted under 35 U.S.C. 154(b) by 29 days.

(21) Appl. No.: 10/223,331

(22) Filed: Aug. 20, 2002

(65) Prior Publication Data
US 2004/0035951 A1 Feb. 26, 2004

(51) Int. Cl.⁷ .......................... B05B 1/10; B05B 15/06; B06S 1/46; F21S 8/00
(52) U.S. Cl. ............................. 239/284.1; 239/284.2; 239/18
(58) Field of Search ........................... 239/284.1, 284.2, 239/17, 18; 262/234

(56) References Cited

U.S. PATENT DOCUMENTS

| | | | | |
|---|---|---|---|---|
| 4,749,126 A | * | 6/1988 | Kessener et al. | 239/12 |
| 6,030,108 A | * | 2/2000 | Ishiharada et al. | 362/562 |
| 6,074,078 A | * | 6/2000 | Georgeff et al. | 362/503 |
| 6,305,618 B1 | * | 10/2001 | Lin | 239/284.1 |
| 6,439,472 B1 | * | 8/2002 | Lin et al. | 239/18 |
| 6,447,137 B1 | * | 9/2002 | Long | 362/96 |
| 6,644,561 B1 | * | 11/2003 | Daane | 239/18 |
| 2003/0133311 A1 | * | 7/2003 | Robertson et al. | 362/555 |
| 2003/0206411 A9 | * | 11/2003 | Dowling et al. | 362/234 |

* cited by examiner

Primary Examiner—William C. Doerrler
(74) Attorney, Agent, or Firm—Troxell Law Office PLLC

(57) ABSTRACT

A water jet mechanism with composite control light-emitting modules, particularly a car water jet mechanism equipped with multiple light-emitting configurations for optional switching control, the base comprising a front assembly unit for installing the water jet assembly; a rear assembly unit, providing at least two accommodating grooves, each installed with a light-emitting member, in electrical connection with a module option control that supplies power for driving control, the module option control is optionally controlled to drive two light-emitting members to independently light or flash, or both simultaneously, to obtain single-color light or multiple-color decoration and enhancement of driving safety, and alarm effect by flashing lights.

15 Claims, 2 Drawing Sheets

WATER JET MECHANISM WITH COMPOSITE CONTROL LIGHT-EMITTING MODULES

BACKGROUND OF THE INVENTION

A conventional water jet mechanism for cars generally involves the installation of a water jet assembly or valve in a casing, whereby a motorist switches on or off the water jet mechanism to spray water or a cleaning liquid onto a windshield, and a wiper moves to brush off dirty matter from the windshield. In other words, the conventional water jet mechanism has only a liquid spraying function. But, the water jet device is located at an engine hood that has the best position for front vision. Mere liquid spraying function could not develop full and effective utilization, such as identification of a driving vehicle, an emergency alarm signal, or such effects.

Another type of light-emitting water jet mechanism for cars has been disclosed in Taiwan Patent No. 454725 and U.S. Pat. No. 6,305,618, wherein;

The water jet mechanism for cars disclosed in Taiwan Patent No. 454725 relates to a depressed groove at a front of a ball valve of a fixing unit, inside the depressed groove being a flattened water jet hole, at two ends of the depressed groove being semi-circular flap blocks, thereby using a U-shaped regulator of the depressed groove and the flap blocks inserted and rotated to adjust the direction of jet, and the flattened water jet hole to obtain a larger area of water jet area, and at a rear of the fixing unit being an LED alarm lamp, emitting light to serve as a safety enhancement and a beautiful decoration; in such a structure, however, though an LED lamp is installed, it give out a single-color light that flashes on and off, serving as mere a decoration. Because the luminosity of the LED lamp is quite limited, its mere light provides inconspicuous effect as an alarm signal.

The water jet mechanism disclosed in U.S. Pat. No. 6,305,618 relates to a spray nozzle installed at a rear end of a transparent base, at a front end of the base being a lighting component, which lights on during the spraying process or when the cleaning liquid is used out; such structure and its operation only when a spray liquid is used out has merely an indicative function advising the user of water spraying function and when the liquid needs topping up, it does not has the function of alarm to alert the motorist or other people beside him of an immediate emergency situation, or the function for enhancing driving safety during nighttime.

SUMMARY OF THE INVENTION

The present invention of water jet mechanism with composite control light-emitting modules has a base comprising of a front assembly unit for assembling a water jet assembly; a rear assembly unit providing at least two accommodating grooves, each accommodating a light-emitting member, and a module option control electrically connected to supply power and enable activation, thereby the user operates the module option control to drive two light-emitting members to independently or simultaneously emit light at the rear end of the water jet mechanism, creating a regular light, or colorful lights flashing on and off; which serves as an alarm signal in times of emergency, or a signal to enhance driving safety during nighttime, or a decorative article.

DETAILED DESCRIPTION OF PREFERRED EMBODIMENTS

Figure 1:
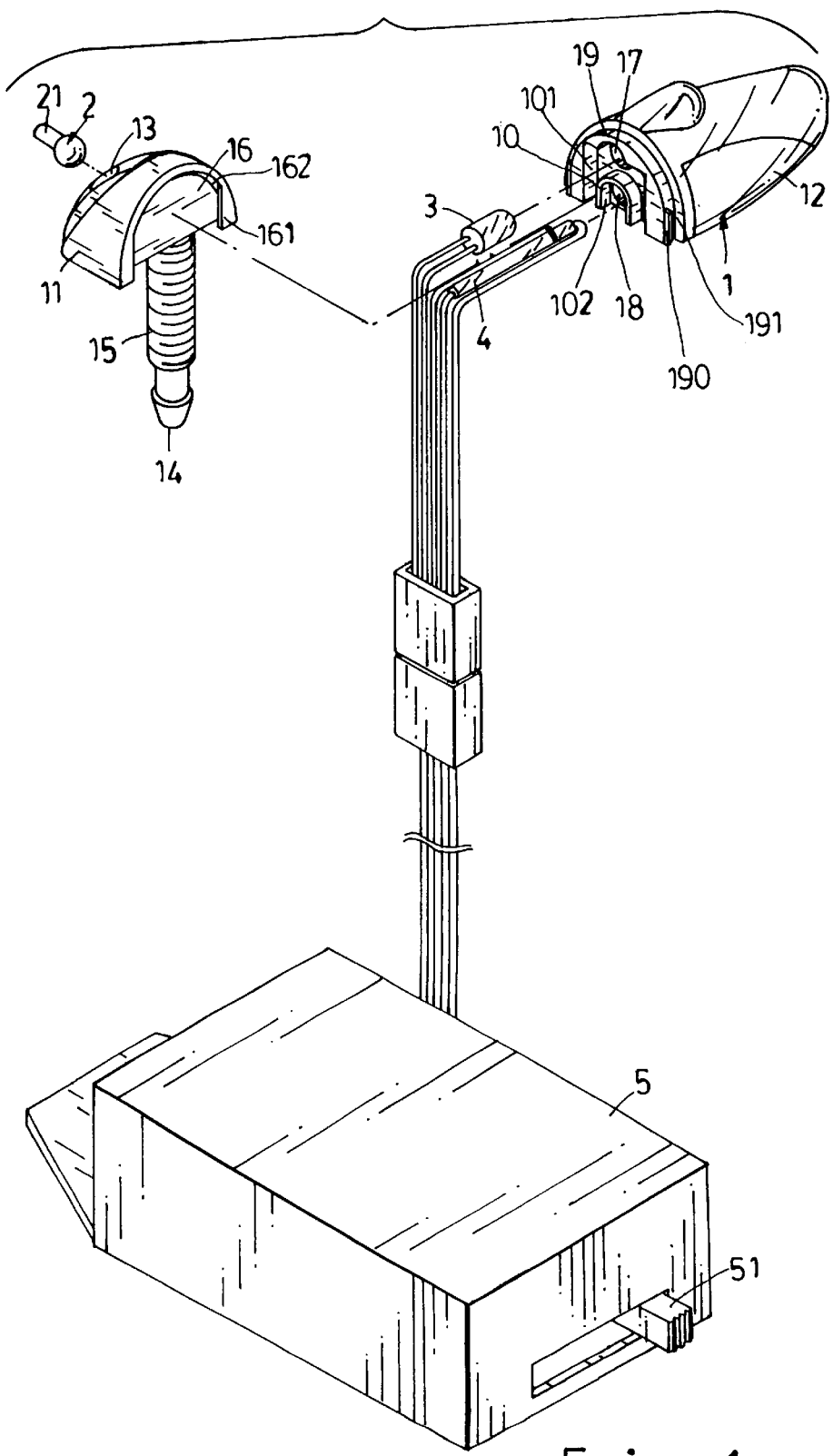
FIG. 1 is an exploded view of a first embodiment the invention.
Figure 2:
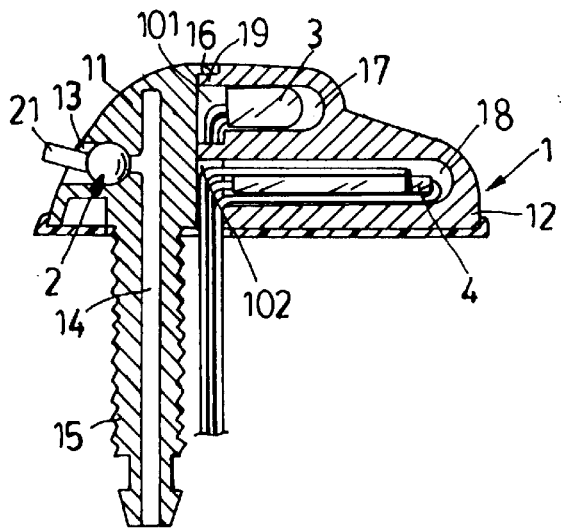
FIG. 2 is a section view of assembled water jet head in the embodiment of FIG. 1.

Please refer to FIGS. 1 and 2 that illustrate a preferred embodiment of the invention loaded with double light-emitting members for composite operation. As shown, the embodiment comprises a base 1, providing multiple directions and configuring spaces, for respective assembly of a water jet assembly 2, light-emitting members 3, 4 and a module switch control 5, as shown in FIG. 1, wherein:

The base 1 comprises a front assembly unit 11, providing at least an embedding groove 13 for embedding the water jet assembly 2. The embedding groove 13 connects with a connecting tube 15 that extends from a lower end of the front assembly unit 11 by a channel 14 running through the embedding groove 13, the connecting tube 15 connecting with a pump and a liquid container (not elaborated or illustrated here because they are well-known art), the front assembly unit 11 providing a connecting groove area 16, for connection with a rear assembly unit 12, protruded inwardly at two sides of the connecting groove area 16 is respectively a flap plate 161, the thickness of the flap plate 161 is smaller than the depth of the connecting groove area 16, so there exists a space channel 162 between the flap plate 161 and the end of the connecting groove area 16. The width of the space channel 162 is equivalent to the thickness of a flap plate 190 of a connecting neck 19 of the rear assembly unit 12; a rear assembly unit 12 providing at least two accommodating grooves 17, 18, the openings of the two accommodating grooves 17, 18 are located at the ends of the connecting neck 19 of the rear assembly unit 12; by means of a protruded partition wall 10, the openings of the accommodating grooves 17, 18 forms a wire accommodating groove 101, 102 respectively on the inside and outside of the partition wall 10, so that a power cord 6 of the light-emitting member 3, 4 can be accommodated in the wire accommodating groove 101 and extended for electrical connection. Besides, there is a connector neck 19 at an end of the rear assembly unit 12, on lower half end of two sides of the connector neck 19 is respectively a flap plate 190, the thickness of the flap plate 190 is smaller than the protruded length of the connector neck 19, so there is a space channel 191 existing between the flap plate 190 and the rear assembly unit 12. The width of the space channel 191 is equal to the thickness of the flap plate 161 of the connecting groove area 16 of the front assembly unit 11, so the front and rear assembly units 11, 12 can be joined and assembled to each other by means of the connecting groove area 16 and the connector neck 19.

The front and rear assembly units 11, 12 of the base 11 are made of light-penetrating materials, to become preferably a transparent base 11, for the production of a light-penetrating base 11 with various colors; the accommodating grooves 17, 18 of the rear assembly unit 12 can be designed in an up-and-down positioned assembly form, or in parallel arrangement assembly form, or oblique or up and down staggered assembly positions, the groove paths of the accommodating grooves 17, 18 can be equal or unequal, depending on the selected light-emitting member 3, 4. The depths of the accommodating grooves 17, 18 can be equal or unequal, depending on the selected light-emitting member 3, 4. In the preferred embodiment described herein, the depths of grooves are designed to be unequal to load light-emitting members 3, 4 of different light-emitting configurations.

The water jet assembly 2 can involve the use of a spray nozzle 21 that is regularly used in a conventional water jet device for cars, and directly assembled to match the embedding groove 13 of the front assembly unit 11, so that the motorist can operate the pump and spray cleaning liquid from the spray nozzle 21 onto a windshield.

The light-emitting member 3, 4 assembled to the accommodating grooves 17, 18 of the rear assembly unit 12 can involve the use of LED lamps and flash tubes. An LED lamp is used in the preferred embodiment, in combination with a flash tube (shown in FIGS. 1 and 2). The light-emitting members 3, 4 are controlled by a module option control 5 that is electrically connected. On the module option control 5 is a control switch 51 having at least three steps of control module settings, including a first control module that independently drives light-emitting member 3 with the LED lamp to light on continuously, for identification and decoration of the car's traveling line; a second control module for independently driving the light-emitting member 4 with the flash tube for continuous flashing operation; and a second control module for simultaneously driving the light-emitting members 3, 4 for simultaneous lighting and flashing operation, serving as an alarm for emergency, for rescue purpose, as well as for enhanced security in identifying the traffic line of a car. The motorist can optionally switch to desired light-emitting module to suit the circumstances.

Figure 3:
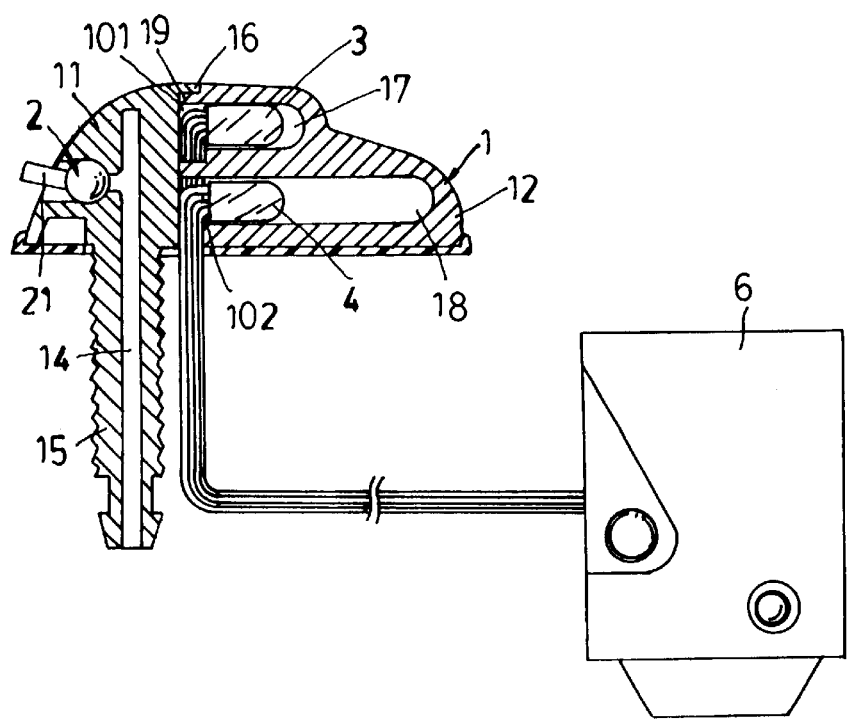
FIG. 3 is a section view of the invention assembled to a multi-color LED lamp set.

The LED lamp and flashtube used in the light-emitting members 3, 4 can be adopted simultaneously or independently. It is not necessary to install the light-emitting members 3, 4 simultaneously in the accommodating grooves 17, 18. Of course, only one accommodating groove 17 or 18 can be used to install a light-emitting member 3 or 4; The LED lamp can be either a single-color type or a color-changing LED lamp 7 with R.G.B color mixing function (capable of simultaneously emitting red light, green light and blue light), as shown in FIG. 3, when connected to a color-mixing control 6, a programmed color-mixing module is used to drive the LED lamp 7 to change multiple colors (at the present there are seven colors available for change), which also serves as identification or alarm signals conspicuously in different circumstances.

It is to be understood that the above description covering the preferred embodiment of the invention shall not be used to restrict the invention in whatever form, and that all modifications or variations made without departing from the spirit of the invention shall be included in the subject claim.

What is claimed is:

1. A water jet mechanism with composite control light-emitting modules, comprising:
   a base consisting of a front assembly unit and a rear assembly unit assembled as a water jet assembly, the rear assembly unit having at least two accommodating grooves;
   two light-emitting members, one of the two light-emitting members being located in each of the two accommodating grooves in the rear assembly unit;
   a module option control electrically connected to the light-emitting members and having module options for multiple functions, the module options being equipped with a module option control with a control switch;
   a water jet assembly connected to the base and controlled by the module option control, the module option control controlling the light-emitting members to emit light from the base.

2. The water jet mechanism with composite control light-emitting modules of claim 1, wherein said base is a material selected from a group consisting of light-penetrating materials having a single color and a light-penetrating base having a plurality of colors.

3. The water jet mechanism with composite control light-emitting modules of claim 1, wherein said accommodating grooves in the rear assembly unit of the base are horizontally positioned.

4. The water jet mechanism with composite control light-emitting modules of claim 1, wherein said accommodating grooves in the rear assembly unit of the base are vertically positioned.

5. The water jet mechanism with composite control light-emitting modules of claim 1, wherein said accommodating grooves in the rear assembly unit of the base are obliquely positioned.

6. The water jet mechanism with composite control light-emitting modules of claim 1, wherein said accommodating grooves in the rear assembly unit of the base are staggered, respectively.

7. The water jet mechanism with composite control light-emitting modules of claim 1, wherein the accommodating grooves in the rear assembly unit of the base are a same size.

8. The water jet mechanism with composite control light-emitting modules of claim 7, wherein the accommodating grooves in the rear assembly unit of the base are different sizes.

9. The water jet mechanism with composite control light-emitting modules of claim 1, wherein said front assembly unit of the base provides a connecting groove area connected with the rear assembly unit, protruded inwardly on two sides of the connecting groove area being a flap plate.

10. The water jet mechanism with composite control light-emitting modules of claim 9, wherein a thickness of the flap plate of the connecting groove area is smaller than a depth of the connecting groove area, forming a channel between the flap plate and the connecting groove area, a width of the channel being equal to the thickness of the flap plate.

11. The water jet mechanism with composite control light-emitting modules of claim 1, wherein a connection neck extends outwardly from an end of the rear assembly unit of the base to connect with the front assembly unit, a flap plate protruding from a lower half on two sides of the connector neck.

12. The water jet mechanism with composite control light-emitting modules of claim 11, wherein a thickness of the flap plate is smaller than an extended length of the connector neck, forming a channel between the flap plate and an end of the rear assembly unit, a width of the channel being equal to the thickness of the flap plate.

13. The water jet mechanism with composite control light-emitting modules of claim 1, wherein each of the two light-emitting members are selected from a group consisting of an LED lamp, a flash tube, and a combination of both.

14. The water jet mechanism with composite control light-emitting modules of claim 13, wherein said LED lamp used for the light-emitting member is a color-changing LED lamp with an R.G.B color-mixing function, in electrical connection with a color-mixing control, and a programmed color-mixing module controlling the color-changing LED lamp for the purpose of multiple-color light effect.

15. The water jet mechanism with composite control light-emitting modules of claim 1, wherein said module option control comprises a first control module to independently drive each of the two lamp light-emitting members for continuous lighting, serving as identification of car moving line and decoration; a second control module to independently drive the flash tube light-emitting member for continuous flashing, and a second control module to simultaneously drive the light-emitting members in simultaneous lighting and flashing, serving s an alarm signal during an emergency, a rescue signal, a means of identifying a car's moving line for enhancement of safety, the light-emitting modules are selectively switched by the motorist to meet immediate circumstances.

* * * * *